United States Patent [19]
Weiss et al.

[11] 3,946,282
[45] Mar. 23, 1976

[54] WIRING INTEGRITY SYSTEM

[75] Inventors: Hubert Leger Weiss, Los Angeles; Ernst Josef Dinkel, Cerritos, both of Calif.

[73] Assignee: American Construction Equipment Co., Inc., Los Angeles, Calif.

[22] Filed: May 15, 1974

[21] Appl. No.: 470,181

[52] U.S. Cl. .................. 317/48; 317/47; 317/27 R; 317/33 SC; 317/112; 307/127; 324/86
[51] Int. Cl.²... H02H 3/14; H02H 3/34; H02H 7/22
[58] Field of Search ............ 317/47, 48, 52, 54, 58, 317/27 R, 33 SC, 31, 22, 148.5 B, 112, 120; 174/52 R; 307/112, 147, 150, 127; 324/82, 83 R, 86

[56] References Cited
UNITED STATES PATENTS

| | | | |
|---|---|---|---|
| 2,975,334 | 3/1961 | Callan | 324/86 X |
| 2,995,670 | 8/1961 | Weiss | 307/147 X |
| 3,110,844 | 11/1963 | Brandt, Jr. | 317/54 X |
| 3,144,502 | 8/1964 | Weiss | 174/52 R X |
| 3,215,865 | 11/1965 | Grimme, Jr. | 317/22 X |
| 3,611,050 | 10/1971 | Weber | 317/48 X |
| 3,633,072 | 1/1972 | Duncan | 317/48 X |
| 3,764,904 | 10/1973 | Drexler | 317/47 X |
| 3,786,312 | 1/1974 | Roussard | 307/147 X |
| 3,795,842 | 3/1974 | Kovacs | 317/31 X |

Primary Examiner—J. D. Miller
Assistant Examiner—Patrick R. Salce
Attorney, Agent, or Firm—Flam & Flam

[57] ABSTRACT

A temporary or portable electrical distribution system includes a distribution box supplied with power by a flexible cable. Field repairs carelessly made or other causes may result in wires being transposed or open. To eliminate hazards and to ensure proper operation of equipment, sensing means including simple circuitry in the distribution box prevents operation of a master box switch except upon the verification of proper wiring.

3 Claims, 3 Drawing Figures

WIRING INTEGRITY SYSTEM

FIELD OF INVENTION

This invention relates to portable or temporary electrical power distribution systems, such as those used for construction, motion picture and television stages, remote set locations, aircraft hangers, mines, shipyards, etc. More particularly, this invention relates to the so-called "Edison System" of power distribution.

BACKGROUND OF INVENTION

Recently attention has been given to so-called ground fault circuit interrupter (GFCI) circuits which are designed automatically to open electrical circuits upon the existence of shock hazards. These GFCI's detect leakage currents, that is, imbalances in the current flowing through the power supply conductors. Certain known GFCI's malfunction if supply conductors are transposed. Accordingly, a secondary object of this invention is to eliminate the chance of malfunctioning of such GFCI's.

SUMMARY OF THE INVENTION

The foregoing objects are made possible by the use of a unique and simple logic circuit that permits a three pole line switch to be closed only when all wiring conditions are right.

BRIEF DESCRIPTION OF THE DRAWINGS

A detailed description of the invention will be made with reference to the accompanying drawings wherein like numerals designate corresponding parts in several figures.

DETAILED DESCRIPTION OF PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
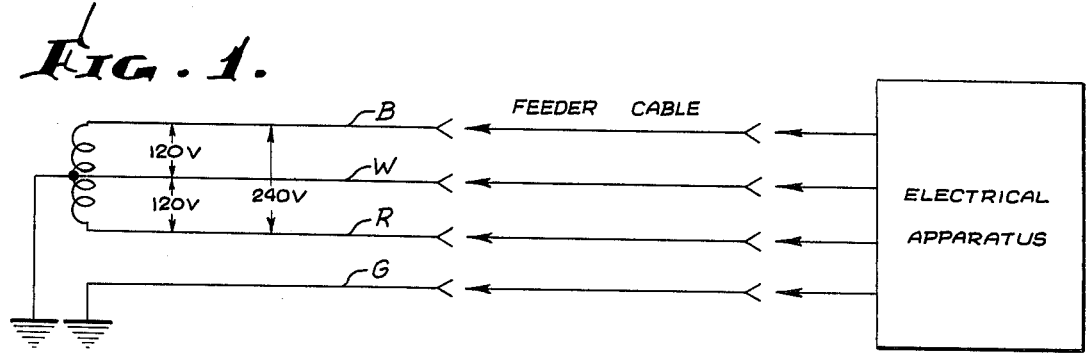
FIG. 1 is a schematic diagram illustrating the "Edison System" of power distribution.
Figure 2:
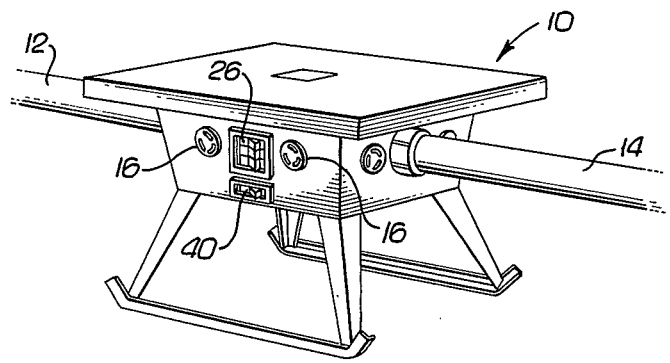
FIG. 2 is a perspective view of a temporary power distribution box and cable, the apparatus incorporating the present invention in the distribution box.

FIG. 1 illustrates the "Edison System" in which conductors B, W and R are connected to a center tapped secondary winding. An auxiliary ground conductor G is illustrated. The portable or temporary power distribution system diagrammatically shown in FIG. 1 includes one or more distribution boxes 10 (FIG. 2) and feeder cables 12 and 14.

The box 10 has male and female connectors at opposite ends for connection of the cables. Conductors B, W, R, G (FIG. 3) located in the box 10 place corresponding terminals of the cable connectors in direct circuit relationship. The box 10 has a series of service sockets 16 that may be used, by way of example, for delivering electrical power to hand tools used on a construction job.

The connectors R, W, B and G conventionally have red, white, black and green insulation. These conductors correspond to the R, W, B and G of the Edison System described above. Three bus bars 52 and 54, are respectively connected to the supply conductors B, W, and R through a three pole main switch S by wires 20, 22 and 24. One or more service sockets are fed from bus bars 50, 52 and 54 through circuit breakers, each preferably incorporating a ground fault circuit interrupter.

The main switch S is normally open. It can be moved to a closed position by manual actuators 26 (FIG. 2) shown as a handle in FIG. 3. Movement of the actuators is effective to close the switch only if a control or holding device 30 is energized. Otherwise the motion of the actuators is lost. Furthermore if the control or holding device 30 is deenergized, the switch opens. Devices of this type are typically made and sold by manufacturers of circuit breakers, and are called under or no voltage trips. Unless a sufficient voltage is applied to the coil 30, the mechanical linkage between handle 26 and main switch S will not be effective. A spring 31, or other return device, such as a magnet, removes a link 33 from the path of operation. When the coil 30 is energized, the main switch S can be closed and, if closed, will be held in closed position as long as the coil 30 remains energized, and the handle 26 is in its switch closing position.

A simple logic circuit causes the coil 30 to be energized only when proper conditions exist. A direct current circuit for the coil 30 is established from a auxiliary power supply terminal T1, lead 32, resistor R1, coil 30, normally open control contact C1, overload contact C2, to the neutral branch wire 22. The auxiliary power supply is energized from the companion "hot" branch wires 20 and 24. Thus a lead 34 connects one hot branch wire 20 to the terminal T1 through a rectifying diode D1, and a companion lead 36 connects the other hot lead 24 to the terminal T1 through a rectifying diode D2. A filter condenser 38 parallels the auxiliary supply terminal T1 and the neutral or current return ground wire 22 in order to smooth the pulsations of the full wave rectified current at the terminal T1.

The resistor R1 has a value designed to limit the current through the coil 30 to an appropriate tolerable magnitude. The overload contact C2 is manually closed by a handle 40 (see also FIG. 2); however, the contact C2 in a well understood manner, will open upon existence of an excessive current through the magnetic coil 44, notwithstanding movement of handle 40 to closed position. To start the system, the handle 40 is first operated to close the overload contact C2. Contact C1 is mechanically linked to the contact C2 and correspondingly closed. A circuit is established for the coil 30 via the power supply as previously described, unless either overload occurs (in which case C2 and C1 will open) or miswiring exists. With the coil 30 energized, the handle can be moved to close the main switch S which will then remain closed so long as no overload occurs.

If a wiring fault exists, a tripping current will be sent through the overload switch contact C2. For this purpose, a sensing circuit is provided in the form of a voltage divider. The voltage divider comprises equal resistors R2 and R3 serially connected across the supposed hot leads 20 and 24. The circuit may be traced as follows: lead 20, resistor R2, midterminal T2, resistor R3, to lead 24. The voltage at leads 20 and 24 if the wiring is proper, is about equal and 180° out of phase. If so, the voltage at terminal T2 is about or nearly zero relative to neutral wire 22. If the wiring is wrong, such that either lead 20 or 24 is connected to the grounded power supply conductor at the box 10 or due to some remote miswiring, then a net voltage will be developed at the terminal T2. This voltage causes the overload contact C2 to open as soon as closure of handle 40 occurs, preventing energization of the holding coil through the companion contact C1. For this purpose, a tripping circuit is established through the overload contact C2 when the voltage at terminal T2 rises sufficiently. The tripping circuit is established from the power supply terminal T1, a controlled semiconductor such as an SCR, a current limiting resistor R4, normally closed contact C3 overload contact C2, to the lead 22. Assuming that lead 22 through miswiring, does not operate as the neutral wire, but instead as a hot wire, and that one of the other leads 20 or 24 is connected to the neutral, then half wave rectified current will be available at power supply terminal T1. Thus if lead 24 is connected to neutral, diode D2 will be operative on alternate half cycles to energize terminal T1. The SCR is normally nonconductive so that the tripping circuit is open; but when the terminal T2 senses miswiring, the SCR is triggered by a control circuit from the sensing terminal T2 to the SCR gate 46. A trigger diode or diac D3 is interposed in the circuit to cause trigger current to flow only when the voltage at terminal T2 reaches a predetermined value whereby spurious responses are prevented. The device D3 becomes conductive only upon existence of an adequate voltage across its terminals. This voltage, which may be 20 to 30 volts, exists only when miswiring of the type described exists. Slight voltage fluctuations at terminal T2 consequently are inadequate to trigger the thyristor SCR.

Assuming a miswiring of the type described, a start atempted by operating the handle or lever 40 closes overload contact C2, and, thereby contact C1. The SCR will have been triggered and current will flow through overload contact C2 from terminal T1, SCR, resistor R4, contact C3, overload coil 44 and overload contact C2 to lead 22. Accordingly, upon the miswiring described, main switch S cannot be closed because overload contact C2 will be opened by the SCR current, and contact C1 will correspondingly open. The same operation of the protective circuits results if one of the hot leads 20 or 24 is open or is opened before the main switch S is closed, such condition resulting in a tripping voltage at sensing terminal T2. The size of the resistor R4 allows enough current to flow through coil 44 to cause overload contact C2 to open, yet protects the SCR.

If one of the hot leads opens only after the main switch S is closed, the circuits supplied by the other of the hot leads remain closed to prevent interruption of current to possibly vital equipment. The contact C3 performs this logical function. This contact is mechanically linked to main switch S so that contact C3 is closed when main switch S is open, and open when main switch S is closed. Thus, assuming initially correct wiring, overload contact C2 is closed, the trigger circuit through SCR is open and main switch S can be closed and will remain closed. Once main switch S is closed, contact C3 is opened, locking out the tripping circuit to overload coil 44 and overload contact C2 should either one of the hot leads open, and notwithstanding the existence of a voltage at terminal T2.

If the grounded power supply conductor W or lead 22 is open circuited, before or after the main switch S is closed, the main switch S must open to prevent hazard to personnel. This function is achieved since the circuit for the device 30 depends upon lead 22 and the grounded power supply conductor W.

Figure 3:
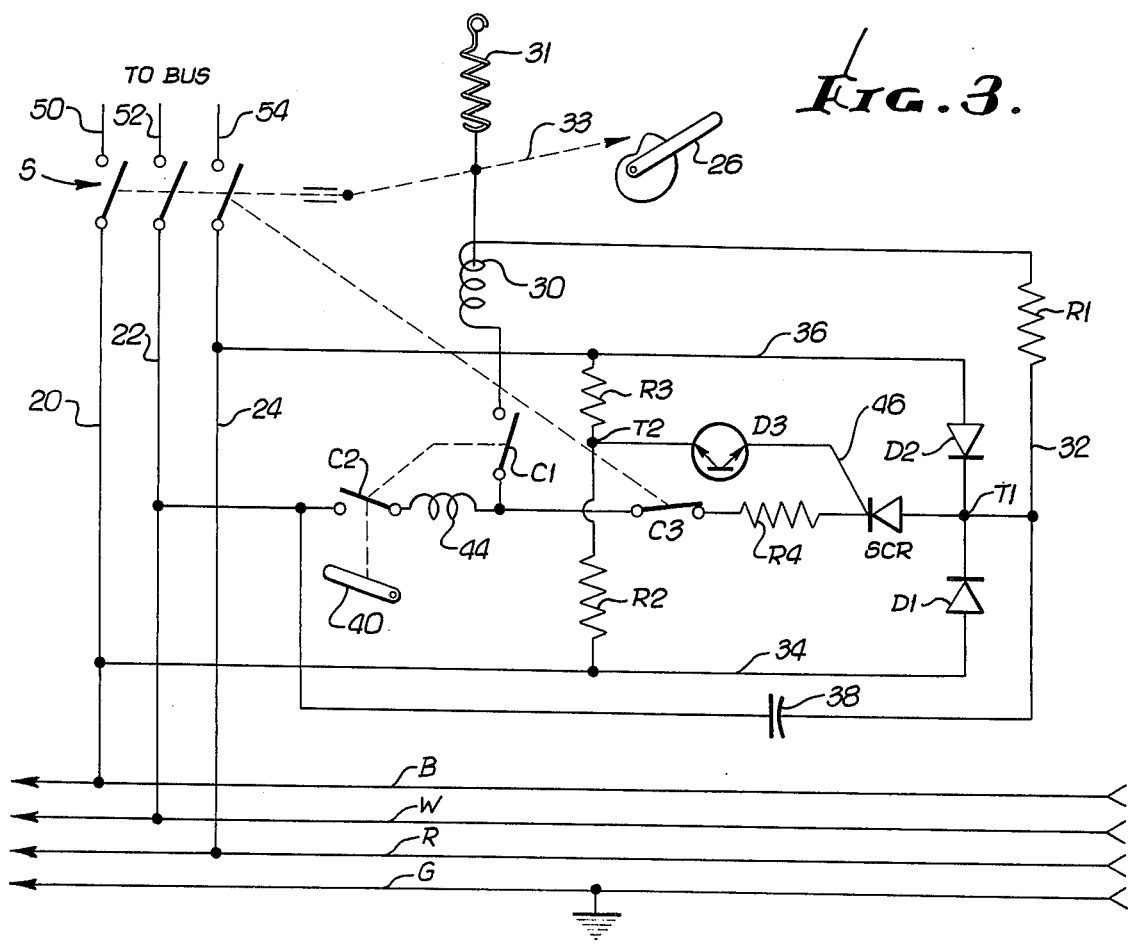
FIG. 3 is a schematic diagram of the protective system.

As shown in FIG. 3, the position of the two handles 26 and 40 indicates possible incorrect wiring. If the overlead switch is on but main switch can't be closed, then there is only one power supply conductor connected (hot or neutral), no power at all or no neutral connection. If the overload switch can't be kept closed, then the wiring is reversed or only one of the hot wires is on.

Intending to claim all novel, useful and unobvious features shown or described, we make the following claims:

1. In a portable or temporary electrical distribution system:
   a. a distribution box;
   b. a plurality of one or more service sockets accessible at the box for connection of a load;
   c. a multiple circuit conductor cable for supplying electrical energy to the box;
   d. a multiple master switch for placing the said one or more service sockets in conductive relationship with the multiple circuit conductor cable
   e. sensing means located in the box for preventing operating of said master switch upon the existence of a transportation of wiring ahead of said sensing means; and
   f. said cable including at least three conductors corresponding to three elements of an Edison distribution system, there being a neutral conductor and two hot conductors, the voltage between the hot conductors being normally twice the voltage between either hot conductor and the neutral conductor; said switch having 3 poles; there being service sockets cooperable with one side of the three conductor system and there being service sockets cooperable with the other side of the three conductor system; said switch once closed remaining closed notwithstanding a later existing wiring fault sensed by said sensing means whereby possibly vital equipment on the companion circuit side remains operatively connected.

2. In a portable or temporary electrical distribution system for a three wire supply system having a neutral and two hot conductor:
   a. a distribution box;
   b. a plurality of service sockets, at least one of which is designated to connect to the neutral and one hot conductor, and at least one other of which is designed to connect to the neutral and the other hot conductor;
   c. a cable having three conductors for supplying electrical energy to the box;
   d. a switch having three poles, said switch having a manual actuator;
   e. manually inaccessible linkage means between the actuator and the switch upon which closure of said switch by said manual actuator is dependent;
   f. sensing means operative only upon the non-existence of a wiring fault for operatively positioning said linkage; and
   g. means for disabling the sensing means once said switch is closed whereby said switch remains closed notwithstanding a subsequent wiring fault.

3. In a portable or temporary electrical power distribution system:

a. a distribution box having one or more service sockets and feeder conductors for feeding electrical power to the service sockets;
b. a power switch having three poles and interposed between the service sockets and said feeder conductors;
c. an electro-mechanical linkage to permit operation of the power switch from open to closed position, including a two state electrical device that must be in one state to render said linkage effective;
d. an electro-mechanical reset device manually movable to a START mode and subject to being electrically tripped to a STOP mode;
e. a controllable switching device having an ON state and an OFF state;
f. an electrical trip circuit for said reset device, and deriving energization from said feeder conductors, and including said controllable switching device;
g. means linking said two state electrical device to said reset device whereby said two state electrical device is in said ONE state when said reset device is in its START mode;
h. a control circuit for said controllable switching device including means sensing a voltage imbalance in said feeder conductors corresponding to open circuit or transposition of the neutral to trip said reset device by causing said controllable switching device to assume its ON state whereby said electro-mechanical linkage is precluded from operation upon existence of such imbalance; and
i. means for disabling said control circuit upon closure of said power switch whereby subsequent parital power circuit open circuit is ineffective to cause said power switch to open whereby possibly vital equipment on one side of said circuit remains in circuit.

* * * * *